United States Patent
Wang et al.

(10) Patent No.: US 8,728,436 B2
(45) Date of Patent: May 20, 2014

(54) SYNTHESIS STRATEGY TOWARD MICROSPHERIC CARBON COATED OFF-STOICHIOMETRIC LITHIUM—IRON—PHOSPHORUS COMPOUND MATERIALS

(75) Inventors: Qian Wang, Hefei (CN); Dajun Liu, Hefei (CN); Xiaoming Xu, Hefei (CN); Long Zhang, Hefei (CN); Yu Zhang, Hefei (CN)

(73) Assignee: Hefei Guoxuan High-Tech Power Energy Co., Ltd., Hefei (CN)

( * ) Notice: Subject to any disclaimer, the term of this patent is extended or adjusted under 35 U.S.C. 154(b) by 149 days.

(21) Appl. No.: 13/563,411

(22) Filed: Jul. 31, 2012

(65) Prior Publication Data

US 2013/0043426 A1    Feb. 21, 2013

(30) Foreign Application Priority Data

Aug. 18, 2011    (CN) .......................... 2011 1 0238095

(51) Int. Cl.
*C01D 1/02*    (2006.01)
(52) U.S. Cl.
USPC ..................... 423/594.2; 429/231.8; 429/221
(58) Field of Classification Search
None
See application file for complete search history.

(56) References Cited

U.S. PATENT DOCUMENTS

| | | | |
|---|---|---|---|
| 5,130,211 A | 7/1992 | Wilkinson et al. | |
| 5,418,090 A | 5/1995 | Koksbang et al. | |
| 5,910,382 A | 6/1999 | Goodenough et al. | |
| 6,085,015 A | 7/2000 | Armand et al. | |
| 6,514,640 B1 | 2/2003 | Armand et al. | |
| 7,060,206 B2 | 6/2006 | Barker et al. | |
| 2010/0065787 A1* | 3/2010 | Armand et al. | ............... 252/506 |

OTHER PUBLICATIONS

Bewlay, et al. "Conductivity Improvements to Spray-produced LiFePO4 by Addition of a Carbon Source", Materials Letters, vol. 58, Issue 11, Apr. 2004, pp. 1788-1791.*
Ni et al. (CN101172595)(a raw machine translation)(Sep. 16, 2009).*
Padhi, A. K., et al., "Phospho-olivines as Positive-Electrode Materials for Rechargeable Lithium Batteries"; Journal of the Electrochemical Society, 1997, vol. 144, No. 4, doi: 10.1149/1.1837571; pp. 1188-1194.
Ravet, Nathalie, et al., "From our readers: On the electronic conductive phospho-olivines as lithium storage electrodes"; Nature Materials 2, 2003, doi: 10.1038/nmat1009a; p. 702.
Gaberscek, Miran, et al., "Is small particle size more important than carbon coating? An example study on LiFePO4 cathodes"; Electrochemistry Communications 9, 2007; doi: 10.1016/j.elecom.2007.09.020; pp. 2778-2783.
Ravet, N., et al., "Electroactivity of natural and synthetic triphylite"; Journal of Power Sources 97-98, 2001, PII: S0378-7753(01)00727-3; pp. 503-507.

(Continued)

*Primary Examiner* — Milton I Cano
*Assistant Examiner* — Carmen Lyles-Irving
(74) *Attorney, Agent, or Firm* — Osha Liang LLP

(57) ABSTRACT

A cathode active material represented by the formula, LiFe$_x$PO$_4$/C, wherein 0.9≤x<1, preferably 0.96≤x<1, which was obtained from carbon pre-coated off-stoichiometric Fe$_x$PO$_4$, wherein 0.9≤x<1, preferably 0.96≤x<1. The materials may be double-carbon-coated particles obtained by carbon coating a mixture of a lithium component and Fe$_x$PO$_4$/C sub-particles, wherein the Fe$_x$PO$_4$/C sub-particles may be obtained by carbon coating Fe$_x$PO$_4$.

7 Claims, 8 Drawing Sheets

(56) References Cited

OTHER PUBLICATIONS

Doherty, Cara M., et al., "Hierarchically Porous Monolithic LiFePO4/Carbon Composite Electrode Materials for igh Power Lithium Ion Batteries"; Chemistry of Materials 2009, 21; pp. 5300-5306.

Lin, Y., et al., "Effects of carbon coating and iron phosphides on the electrochemical properties of LiFePO4/C"; Journal of Power Sources 184, 2008; pp. 444-448.

Wang, Ke, et al., "Process investigation, electrochemical characterization and optiimization of LiFePO4/C composite from mechanical activation using sucrose as carbon source"; Electrochimica Acta 54, 2009; pp. 2861-2868.

Yi, Ting-Feng, et al., "High-performance Li4Ti5-xVxO12 (0£x£0.3) as an anode material for secondary lithium-ion battery"; Electrochimica Acta 54, 2009; pp. 7464-7470.

Zhu, Nan, et al., "Graphene as a conductive additive to enhance the high-rate capabilities of electrospun Li4Ti5O12 for lithium-ion batteries"; Electrochimica Acta 55, 2010; pp. 5813-5818.

Gabrisch, Heike, et al., "Carbon Surface Layers on a High-Rate LiFePO4"; Lawrence Berkeley National Laboratory, published Sep. 6, 2005; http://www.escholarship.org/uc/item/2n1647pg (8 pages).

* cited by examiner

SYNTHESIS STRATEGY TOWARD MICROSPHERIC CARBON COATED OFF-STOICHIOMETRIC LITHIUM—IRON—PHOSPHORUS COMPOUND MATERIALS

CROSS REFERENCE TO RELATED APPLICATIONS

This application claims the priority of Chinese Application No. 201110238095.7 filed on Aug. 18, 2011, the disclosure of which is incorporated by reference in its entirety.

BACKGROUND OF INVENTION

1. Field of the Invention

The present invention relates to the field of lithium batteries, particularly to materials for cathodes of lithium ion batteries.

2. Background Art

Lithium-ion batteries (LIBs) have received most attention at both fundamental and applied levels, and thus have had rapid development and occupied the main market of battery devices, owing to the higher operating voltage and energy density as compared to lead-acid or Ni-MH battery.

Since lithium-ion batteries (LIBs) were introduced into market, the application targets have evolved into other areas from the initial applications in various small portable devices, such as cell phones, camcorders, digital cameras and laptop computers, etc. The small-sized lithium-ion battery used for mobile devices is called the first generation lithium-ion battery. Currently, much concern has been devoted to the next generation large-scaled lithium-ion battery used for hybrid electric vehicles (HEVs) and electric vehicles (EVs).

Spinels, such as $LiCoO_2$, $LiNiO_2$, $LiMn_2O_4$ and $LiNi_{1-x}Co_xO_2$, have been preferred previously as cathode active materials because these materials have a high energy density and a high voltage p1-p2 (U.S. Pat. No. 5,130,211, issued to Wilkinson et al.; U.S. Pat. No. 5,418,090, issued to Koksbang et al.). However, such materials suffer from high cost and thermal instability. Moreover, these cathode active materials are higher in toxicity and liable to pollute the environment significantly. Therefore, it should be one of the most dominant research activities targeting the development of abundant resources as cathode materials in terms of power density (rate capability), energy density, stability (cycle life), safety and cost.

Since the pioneering work of Padhi et al. (Padhi et al., *J. Electrochem. Soc.* 1997, 144, 1188; see also, U.S. Pat. No. 5,910,382, issued to Goodenough et al.), olivine-typed $LiFePO_4$, with the merits of high stability and environmental safety, high theoretical capacity, and low cost (Ravet et al., *Nat. Mater.* 2003, 2, 702; Gaberscek et al., *Electrochem. Commun.* 2007, 9, 2778; U.S. Pat. No. 6,514,640, issued to Armand et al), has won the challenge to become the most promising cathode materials of the new generation of lithium-ion batteries needed for electric mobility.

However, the vital disadvantages of $LiFePO_4$ as an electrode material lie in its low intrinsic electronic conductivity and poor rate of performance. During the past decade, much effort has been devoted to the understanding and improvement of the performances of $LiFePO_4$.

Armand et al. were the first to show that $LiFePO_4$ with a carbon coating can achieve almost the theoretical capacity (Ravet et al., *J. Electrochem. Soc. Abstr.,* 1999, 99-2, 172; Ravet et al., *J. Power Sources,* 2001, 97-98, 503; U.S. Pat. No. 6,085,015, issued to Armand et al). After this work, numerous studies have indicated that electronically conductive coating (mainly carbon) is one of the most efficient techniques to enhance the surface electronic conductivity of $LiFePO_4$ particles (Doherty et al., *J. Drummond, Chem. Mater.* 2009, 21, 5300). In addition, carbon coating can play a role in reducing the particle size of $LiFePO_4$ by inhibiting particle growth during sintering (Lin et al., *J. Power Sources,* 184 (2008) 444), and suppressing the oxidation of $Fe^{2+}$ to $Fe^{3+}$ during sintering and thus simplifying the atmosphere requirement in synthesis (Wang, R. Cai, T. Yuan, X. Yu, R. Ran, Z. Shao, Electrochem. Acta 54 (2009) 2861; U.S. Pat. No. 7,060,206, issued to Barker et al).

It is commonly recognized that the rate capability of $LiFePO_4$ powder could be increased by minimizing the size of the particles as much as possible to improve the effective surface that is active for electrochemical reactions. Moreover, smaller size theoretically reduces the paths for the electrons and the $Li^+$ ions inside the particles. However, from the standpoint of manufacturing, the excessive reduction in sizes causes a poor post-processing performance of cells, such as ultrahigh surface effects, low tap densities and over utilization of N-methyl-2-pyrrolidone (NMP) dosage. Therefore, large-scale and eco-efficient synthetic techniques with considerations of electrochemically activities, particle sizes, cation order, and post-processing performance are important to the success of the electrode material.

SUMMARY OF INVENTION

One aspect of the invention relates to cathode active materials. A cathode active material is represented by the formula, $LiFe_xPO_4/C$, wherein $0.9 \le x < 1$, preferably $0.96 \le x < 1$, which was obtained from carbon pre-coated off-stoichiometric $Fe_xPO_4$, wherein $0.9 \le x < 1$, preferably $0.96 \le x < 1$. The materials may be double-carbon-coated particles obtained by carbon coating a mixture of a lithium component and $Fe_xPO_4/C$ sub-particles, wherein the $Fe_xPO_4/C$ sub-particles may be obtained by carbon coating $Fe_xPO_4$.

Another aspect of the present invention relates to a novel strategy for the fabrication of the hierarchical mesoporous double-carbon-coated $LiFe_xPO_4$ microspheres. The synthetic approach synergistically combines the dual carbon coating and spray-drying processes. Double conductive coating can greatly improve the uniformity of the carbon layer on both the primary and secondary $LiFe_xPO_4/C$ particles, and afford large capacities at high discharge rates. Moreover, two steps of spray-drying and post-annealing can realize the hierarchical microsized secondary particles containing nanoscale primary particles. This novel structure has the advantages of significantly reducing the diffusion paths of the lithium ions and high tapped density. In addition, embodiments of the present invention use water as a solvent, thereby avoiding the hidden safety problems and the high production and recycling costs of organic solvents.

A method for preparing a cathode active material in accordance with one embodiment of the invention includes drying an aqueous mixture containing $Fe_xPO_4$ and a carbon precursor to obtain a dried mixture, wherein $0.9 \le x < 1$; sintering the dried mixture to obtain $Fe_xPO_4/C$ microspheres; mixing the $Fe_xPO_4/C$ microspheres with a lithium salt and a second carbon precursor in distilled water to form a second mixture; drying the second mixture to obtain a dried second mixture; and calcining the second dried mixture to obtain the cathode active material.

Embodiments of the invention also relate the as-synthesized hierarchical microspherical $LiFe_xPO_4/C$ compositions for use as active cathode materials in lithium insertion-type electrodes. With these materials, fast charge and discharge rates are obtained at room temperature and an excellent energy density is observed.

BRIEF DESCRIPTION OF DRAWINGS

A complete appreciation of the invention will be readily obtained by reference to the following detailed description and the accompanying drawings.

DEFINITION

Figure 1:
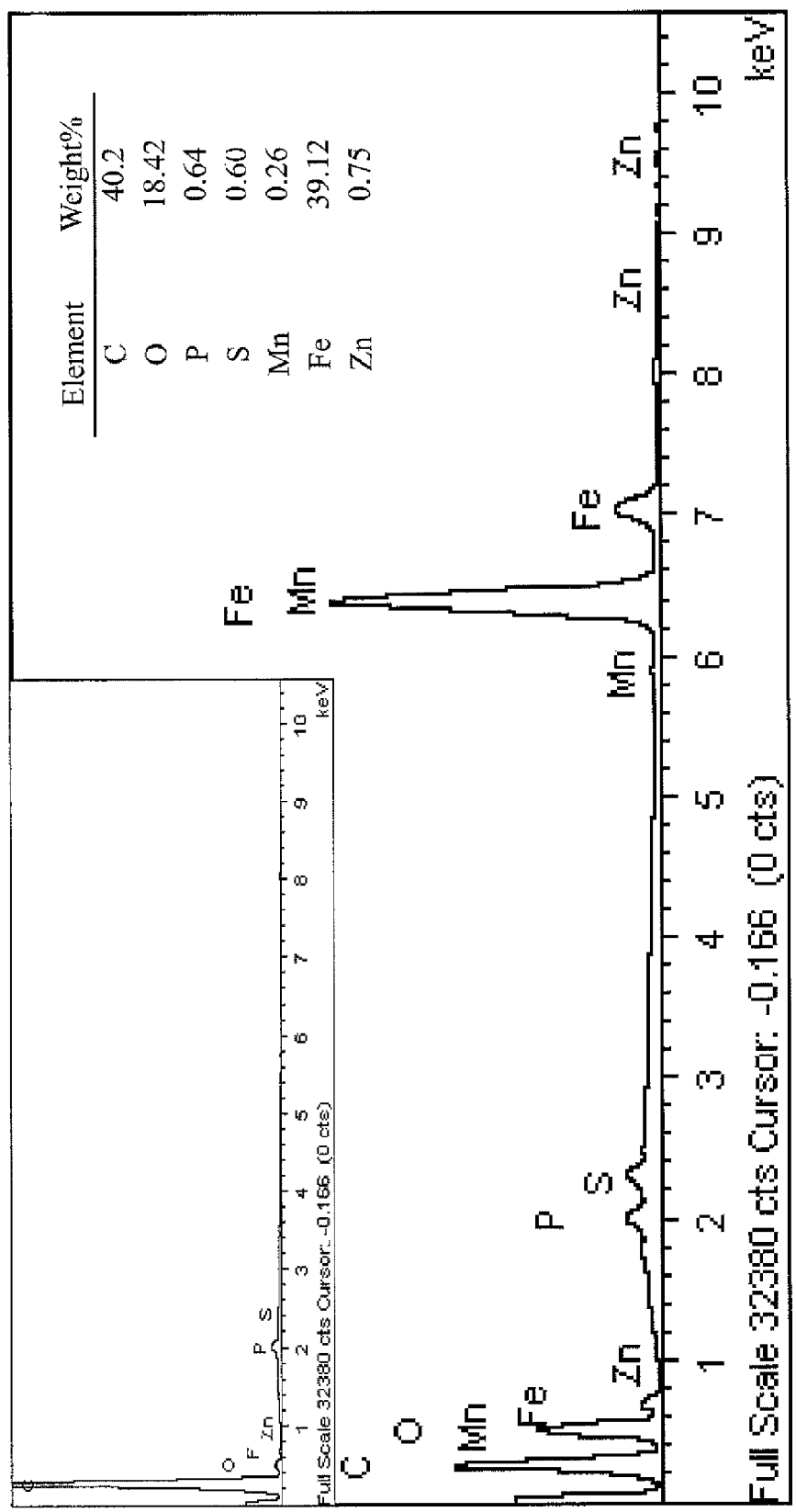
FIG. 1 illustrates an Energy Dispersive X-ray Spectroscopy (EDS) spectrum of spots on a separator; inset is an EDS spectrum of a pure separator.

As used herein, the term "tapped density" has its normal meaning in the art of powder characterization. Specifically, "tapped density" is measured by mechanically tapping a measuring cylinder containing a powder sample. After observing the final volume, the cylinder is mechanically tapped, and volume readings may be taken until no or little further changes in the volume is observed.

As used herein, a "carbon precursor" refers to a carbon containing compound that can provide a carbon coating of the $Fe_xPO_4/C$ or $LiFe_xPO_4/C$ microspheres. Examples of carbon precursors include inorganic (C) or organic carbon source, such as sucrose ($C_{12}H_{22}O_{11}$), glucose ($C_6H_{12}O_6$), citric acid ($C_6H_8O_7$), ascorbic acid ($C_6H_8O_6$), acetylene black, and the like. A carbon precursor for the first carbon coating may be the same or different from the carbon source for the second carbon coating in accordance with embodiments of the invention.

As used herein, a "lithium precursor" refers to a lithium containing compound that can provide lithium ion ($Li^+$) in the $LiFe_xPO_4/C$ microspheres. Examples of lithium precursors include any lithium organic salt or inorganic salts, such as lithium carbonate ($Li_2CO_3$), lithium bicarbonate ($LiHCO_3$) lithium acetate ($CH_3CO_2Li$), lithium hydroxide (LiOH), lithium nitrate ($LiNO_3$), lithium halide (LiX, wherein X is F, Cl, Br, or I), and the like.

As used herein, the term "off-stoichiometric" or "sub-stoichiometric" iron-lithium phosphate means that the ratio of iron to lithium (or phosphate) in the complex is less than 1—i.e., less iron than lithium (or phosphate), such as $LiFe_{0.98}PO_4$. Because the iron content is less than 1 equivalent, the complex may contain other elements, such as other metals (e.g., alkaline metals, alkaline earth metals, transition metals, and the like). Sub-stoichiometric or off-stoichiometric iron content is preferred based on the fact that there are plenty of spots on the separator after the experiments of cycling performances of the cells made of the stoichiometric lithium-iron-phosphate. Due to the potential risk of short circuit caused by high iron content dissolved in electrolytes, off-stoichiometric lithium-iron-phosphate is better. Therefore, the ratio of iron to phosphorus is off-stoichiometric in the raw ferric phosphate sources.

As used herein, the term a "double-carbon-coated" composite or particle refers to a composite or particle that is prepared by two-stage carbon coatings. First, a starting material (e.g., off-stoichiometric iron phosphate) is coated with carbon to produce carbon-coated sub-particles, which are then mixed with one or more other components (e.g., lithium salt) and then carbon coated one more time. In accordance with embodiments of the invention, the particles, for example, may be micrometer sized particles that comprise a plurality of nanometer sized sub-particles.

As used herein, the term "molar ratio" refers to the number of moles of component A relative to component B when the component B is present at 1.0 mole. For Example, "a molar ratio of a carbon precursor and $Fe_xPO_4$ is 0.15" means that there are 0.15 mole of the carbon precursor and 1.0 mole of $Fe_xPO_4$.

Note that disclosure of numerical ranges in the present description does intend to include individual numbers within the range, i.e., as if they were individually disclosed.

DETAILED DESCRIPTION

Having generally described the present invention, a further understanding can be obtained by reference to the specific preferred embodiments, which are provided herein for the purpose of illustration only and are not intended to limit the scope of the invention.

Embodiments of the present invention relate to cathode active materials for lithium-ion batteries with an appropriate off-stoichiometry in lithium-iron composite phosphorus oxide, having a formula of $LiFe_xPO_4$, wherein $0.9 \leq x < 1$, preferably about $0.94 \leq x < 1$, more preferably about $0.96 \leq x < 1$, and most preferably x is about 0.98. To obtain the $LiFe_xPO_4$, the ratio of iron to phosphorus in raw $Fe_xPO_4$ is very important. In accordance with embodiments of the invention, the $LiFe_xPO_4$ powders for use as cathode active materials are coated with dual carbon layers.

Conventional cells having cathodes made of stoichiometric lithium-iron-phosphate compounds may show a large number of spots on separators after multiple cycles of charges-discharges. As shown in FIG. 1, Energy Dispersive X-ray Spectroscopy (EDS) spectra show that the iron contents of the spots are much higher than the iron contents in other regions. It is believed that iron deposition occurred during long-term cycling of cells having cathodes made of stoichiometric lithium-iron-phosphate compounds, because the possibility of introducing iron from the environment is eliminated during the entire period of the electrochemical experiment shown in FIG. 1. Due to potential problems of short circuit caused by high iron contents and iron deposition (as shown in FIG. 1), embodiments of the invention involve off-stoichiometric (sub-stoichiometric) ratio of iron and phosphorus in the ferric phosphate composites.

In accordance with embodiments of the invention, $Fe_xPO_4$ or $Fe_xPO_4 \cdot nH_2O$, wherein n stands for the number of hydrates (i.e., n is an integer from 1 to 4), a lithium precursor, and a carbon precursor may be used as starting materials to synthesize the $LiFe_xPO_4/C$ composites. In accordance with some embodiments of the invention, a method for preparing high purity products may include the following basic steps: (1) the $Fe_xPO_4/C$ precursors are obtained through spray drying of a water-based mixture of $Fe_xPO_4 \cdot nH_2O$ powder and a carbon precursor; (2) the dried mixture are calcined at 400-600° C. under a nitrogen atmosphere to form nanocrystalline microspheres; and (3) the as-obtained nanocrystalline $Fe_xPO_4/C$ microspheres are mixed with a stoichiometric amount of a lithium salt and a carbon precursor to undergo lithiating and a second carbon-coating, via another spray-drying and calcination processes to provide double-carbon-coated $LiFe_xPO_4$ microspheres.

Figure 8:
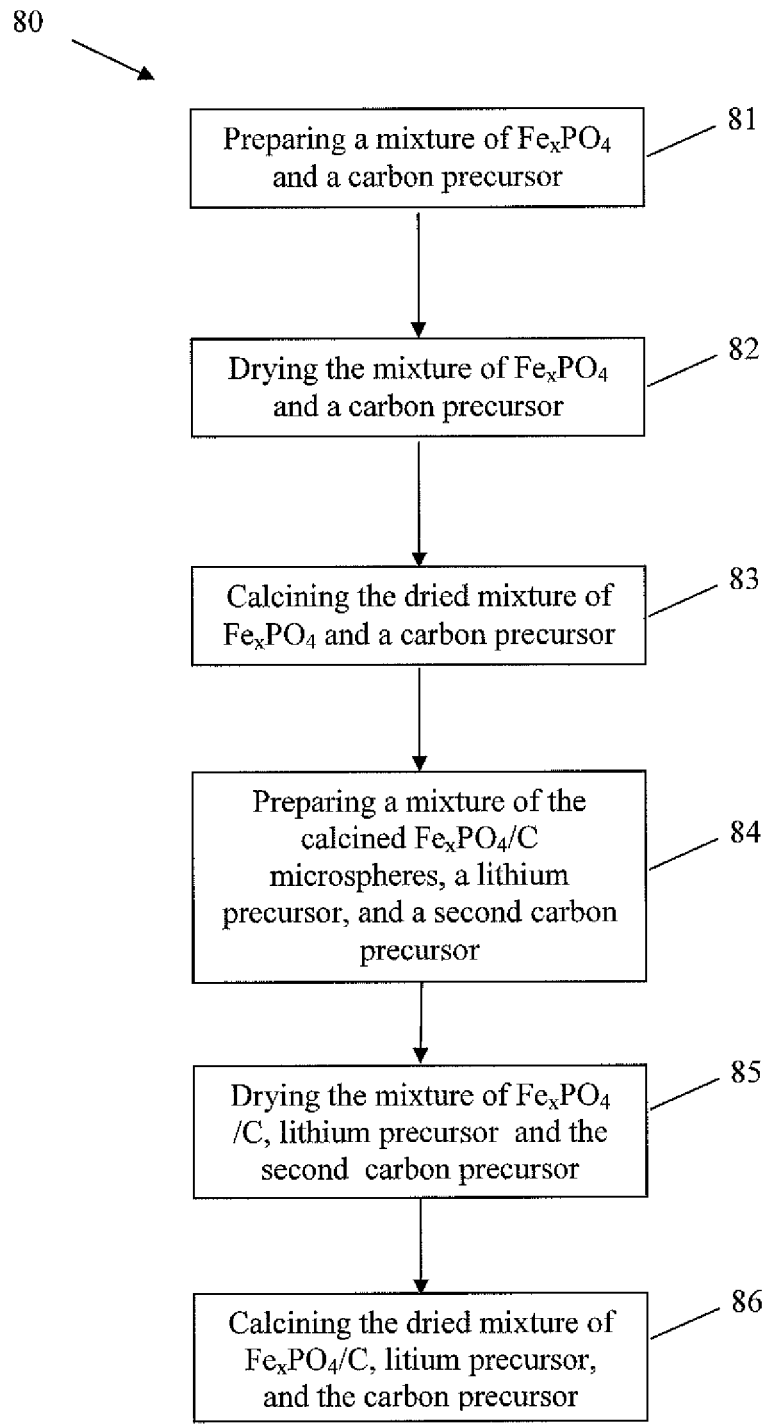
FIG. 8 shows a flowchart illustrating one method in accordance with one embodiment of the invention.

For example, FIG. 8 shows a flowchart illustrating a method in accordance with one embodiment of the invention. As show, a method 80 may start with preparing a mixture of $Fe_xPO_4$, wherein $0.9 \leq x < 1.0$, more preferably $0.96 \leq x < 1.0$, and a carbon precursor (step 81). The $Fe_xPO_4$ may be supplies as a hydrate, $Fe_xPO_4 \cdot nH_2O$, wherein n is the number of water molecules in the hydrate (i.e., n is an integer from 1 to 4). The carbon precursor can be any organic compound or inorganic compound that can generate carbon at high temperature. Examples of the carbon precursors such as sucrose ($C_{12}H_{22}O_{11}$), glucose ($C_6H_{12}O_6$), citric acid ($C_6H_8O_7$), ascorbic acid ($C_6H_8O_6$), acetylene black, and the like. A molar ratio of the carbon precursor and the $Fe_xPO_4$ may be 0.08-0.15. The mixture may be made as an aqueous slurry or solution. The use of water (such as distilled water) avoids organic solvents, which may pose safety concerns as well as environmental costs.

Then, the mixture is dried (step 82). The drying may be performed with any known techniques, such as air drying or spray drying. In accordance with embodiments of the invention, the drying is preferably performed with spray drying so that the products will have spherical morphology, which will have short paths for the ions to diffuse in and out from all directions. The dried mixture is then sintered at a high temperature (step 83). The sintering temperature, for example, may be from 400-600° C. Furthermore, the sintering may be performed under an inert atmosphere (e.g., a nitrogen atmosphere) to form nanocrystalline microspheres of $Fe_xPO_4/C$, in which each of the microspheres of $Fe_xPO_4$ may be coated with a thin layer of carbon.

The $Fe_xPO_4/C$ microspheres are mixed with a lithium precursor and a second carbon precursor, which may be the same or different from the first carbon precursor, to form a second slurry or solution (step 84). The lithium precursor may be an organic or inorganic salt containing lithium as a cation, such as $LiOH$, $LiCl$, $LiC_2O_3$, $LiCH_3CO_2$, and the like. The molar ratio of lithium and phosphorus in the second mixture is 1.0-1.1. An amount of the second carbon precursor may be determined according to a carbon content of the $Fe_xPO_4/C$ microspheres to provide a final carbon content of 2.0-5.0 wt %. The slurry or solution may use water (e.g., distilled water) as a solvent to avoid the problems and costs of organic solvents. The mixture slurry or solution is again dried (step 85). Again, the drying may be performed using any technique known in the art, including spray drying.

Finally, the dried mixture may be calcined at a high temperature to produce a double-carbon-coated $LiFe_xPO_4/C$ powders or particles, which can be advantageously used as cathode active materials for lithium ion batteries (step 86). The calcining may involves annealing at a high temperature (e.g., about 400-600° C.) for a proper duration (e.g., for 2 hours). Furthermore, the calcining may also include treatment at a high temperature (e.g., 650-750° C.) by heating the annealed products at a rate of 2-10° C. per minute. The high temperature (e.g., 650-750° C.) treatment (curing) may be performed for a selected duration (e.g., 10-15 hours).

Using methods of the present invention, one may fabricate uniform spherical $LiFe_xPO_4/C$ powders that have novel hierarchical microstructures composed of carbon-coated micrometer-sized secondary spheres that contain nano-sized carbon-coated primary spheres. This hierarchical spherical microstructure provides optimized performances by a combination of both advantages of two size scales. The nanoscale primary spheres have reduced path lengths for the electrons and the $Li^+$ ions to move in and out of the particles and have increased effective surface areas that are active for electrochemical reactions, while the micrometer-scale secondary spheres would have higher tapped densities, and good post-processing performances (e.g., better flowability). Therefore, the hierarchical spherical microstructures in accordance with embodiments of the invention would have excellent electrochemical properties, as well as high producing and processing performances.

Figure 2:
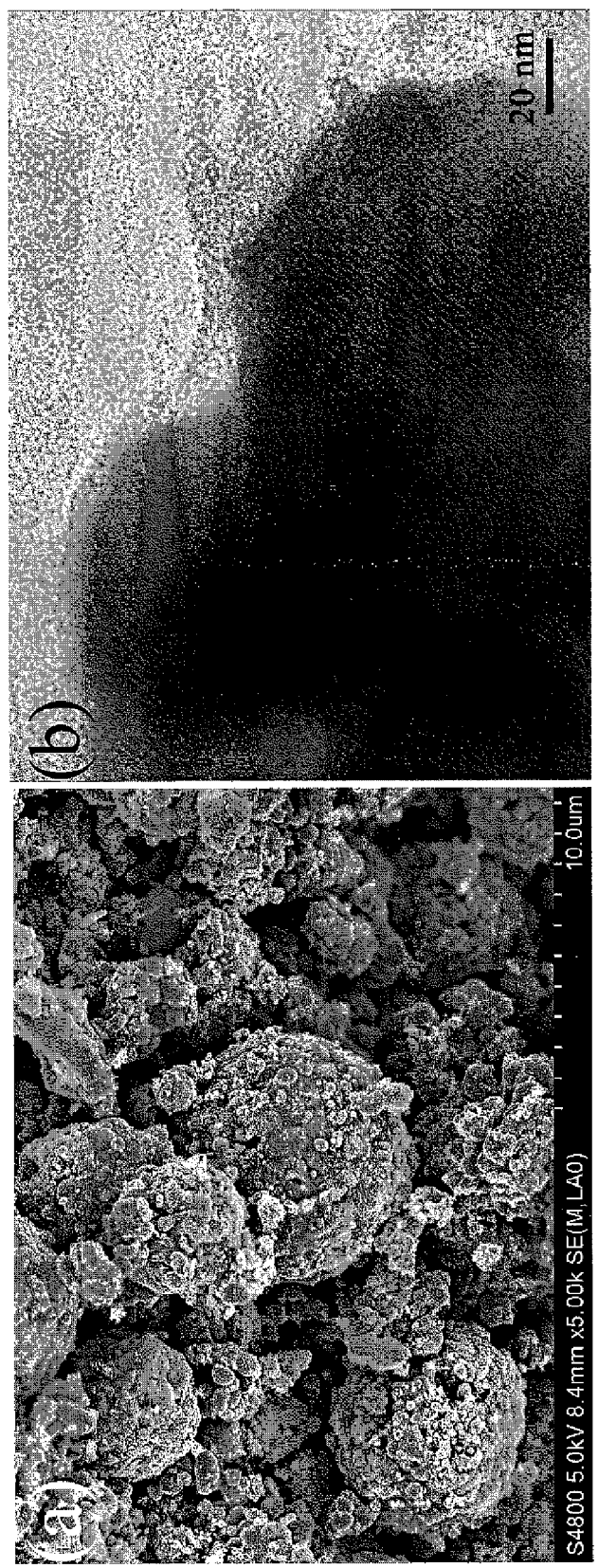
FIG. 2 illustrates SEM and TEM images of double-carbon-coated $LiFe_{0.98}PO_4$ microspheres produced in accordance with one embodiment of the present invention.

FIG. 2 shows the SEM and TEM images of double-carbon-coated $LiFe_{0.98}PO_4$ microspheres in accordance with embodiments of the invention. As shown, the resulting materials have morphology of hierarchical mesocrystal spheres, which are formed by self-assembly of the primary $LiFe_{0.98}PO_4$ nanospheres. Successful uniform carbon coating on the surface of $LiFe_{0.98}PO_4$ is suggested by the transmission electron microscopy (TEM) image shown in FIG. 2b. The carbon content in the double-carbon-coated $LiFe_{0.98}PO_4$ microspheres is estimated to be about 2.38 wt %.

Figure 3:
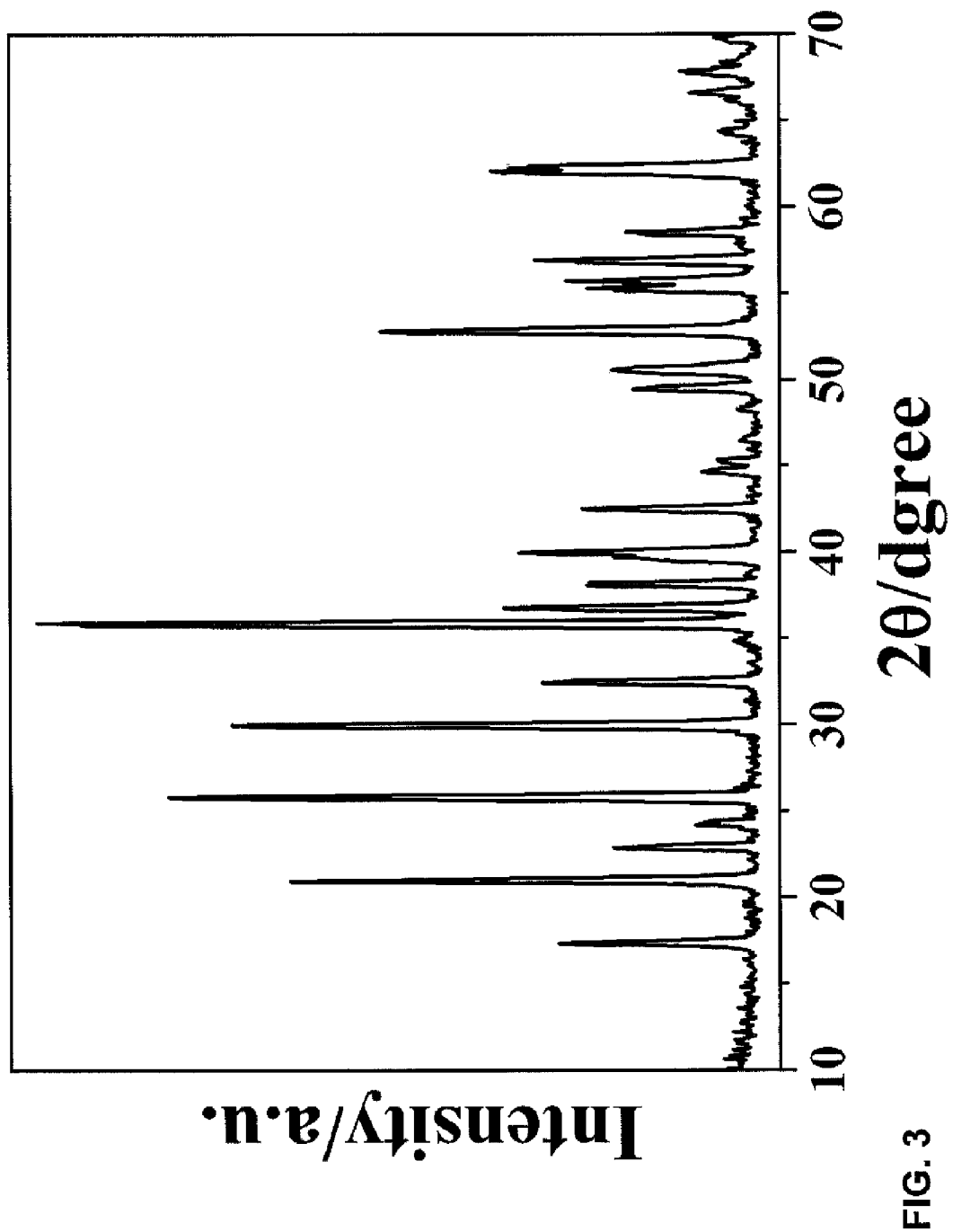
FIG. 3 illustrates XRD (Cu Kα) patterns of double-carbon-coated $LiFe_{0.98}PO_4$ powders according to one embodiment of the present invention.

FIG. 3 shows an X-ray diffraction (XRD) pattern of double-carbon-coated $LiFe_{0.98}PO_4$ powders. It can be clearly seen that the diffraction peaks for $LiFe_{0.98}PO_4/C$ are indexed to an orthorhombic olivine space group, Pmna (JCPDS 81-1173). This confirms the presence of $LiFe_{0.98}PO_4$ as a single-crystalline phase in the powder. Additionally, there is no evidence in the XRD pattern for the presence of carbon, due to its amorphous structure and its small amount with respect to the $LiFe_{0.98}PO_4$ phase.

Figure 4:
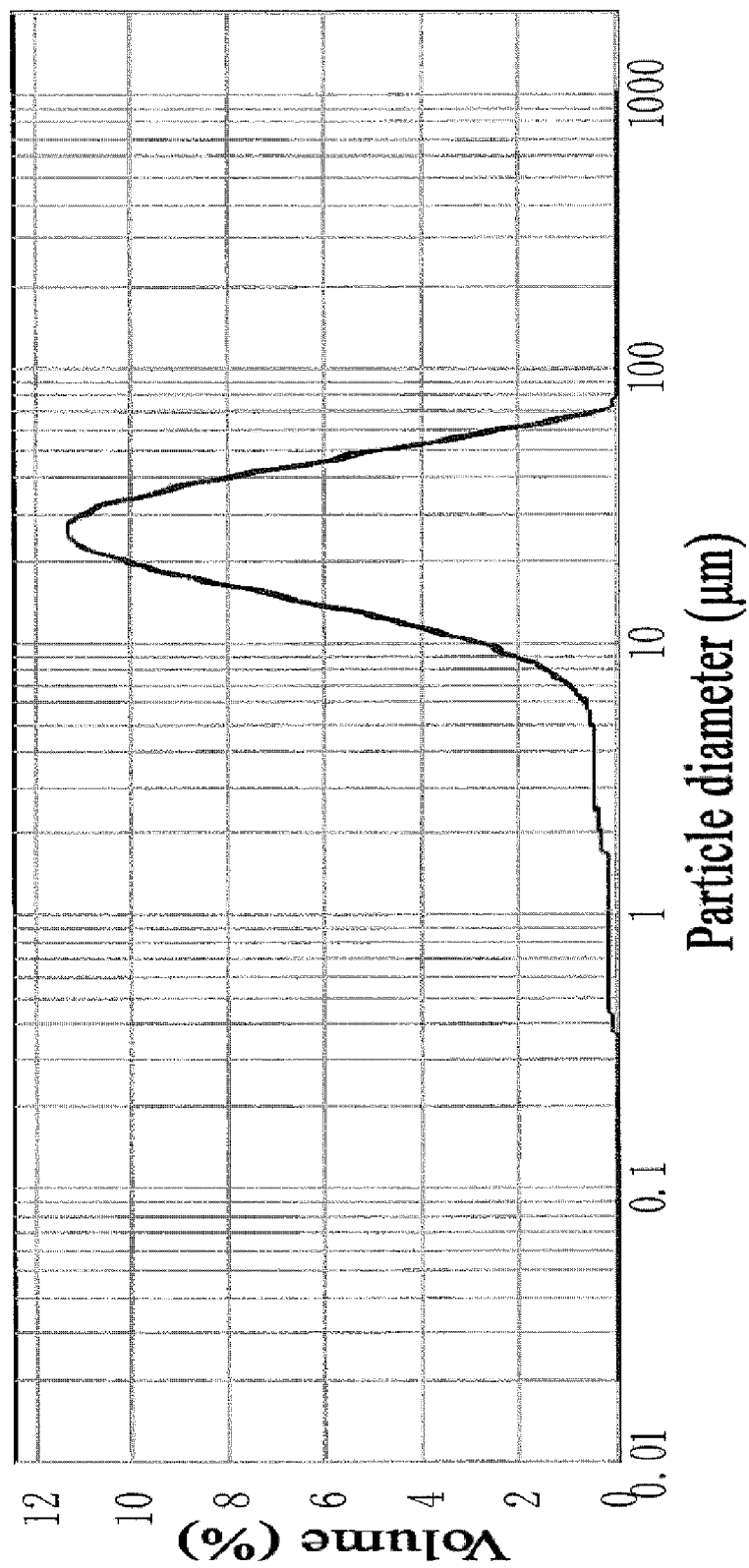
FIG. 4 illustrates a particle size distribution (volume-based) of double-carbon-coated $LiFe_{0.98}PO_4$ powders produced in accordance with an embodiment shown in Example 1 of the invention.

The particle size distribution of the resultant double-carbon-coated $LiFe_{0.98}PO_4$ is shown in FIG. 4. To illustrate the advantageous particle size distribution and the absence of the disruptive larger particles in the products according to embodiments of the invention, the volume-based data are shown. The values based on the particle fraction (%) are as follows: D50 value about 24.0 µm; D10 value less than 10.8 µm; D90 value about 44.9 µm; and the difference between the D90 value and D10 value less than 34.1 µm.

In this example, the tapped density of the hierarchical double-carbon-coated $LiFe_{0.98}PO_4$ microspheres is measured to be 1.2 $g \cdot cm^{-3}$ ($g/cm^3$), which is greater than those obtained for common (nanosized) $LiFePO_4$ morphologies of 1.0 $g \cdot cm^{-3}$. The higher tapped density may be of great importance to the transportation applications of lithium batteries, because it ensures a low reactivity and a high volumetric energy density. Embodiments of the invention typically have tapped densities greater than 1.0 $g \cdot cm^{-3}$, preferably greater than 1.1 $g \cdot cm^{-3}$, more preferably greater than 1.2 $g \cdot cm^{-3}$. In some embodiments, the tapped densities may be in the ranges of 1.0 $g \cdot cm^{-3}$-1.3 $g \cdot cm^{-3}$, more preferably in the range of 1.1 $g \cdot cm^{-3}$-1.3 $g \cdot cm^{-3}$, and most preferably in the range of 1.15 $g \cdot cm^{-3}$-1.25 $g \cdot cm^{-3}$. Any mention of a numerical range in this description intends to cover all numbers between the upper and lower limits.

Moreover, the double-carbon-coated $LiFe_{0.98}PO_4$ powders in accordance with embodiments of the invention have larger Brunauer-Emmett-Teller (BET) surface areas, as compared with carbon-free $LiFePO_4$ powders. In general, the double-carbon-coated $LiFe_{0.98}PO_4$ powders in accordance with embodiments of the invention may have BET surface areas in a range of 18 $m^2 \cdot g^{-1}$-25 $m^2 \cdot g^{-1}$, more preferably in a range of 20 $m^2 \cdot g^{-1}$-23 $m^2 \cdot g^{-1}$, and most preferably in a range of 21 $m^2 \cdot g^{-1}$-23 $m^2 \cdot g^{-1}$. For example, in some embodiments, the double-carbon-coated $LiFe_{0.98}PO_4$ powders may have Brunauer-Emmett-Teller (BET) surface areas of 21.53 $m^2 \cdot g^{-1}$.

Figure 5:
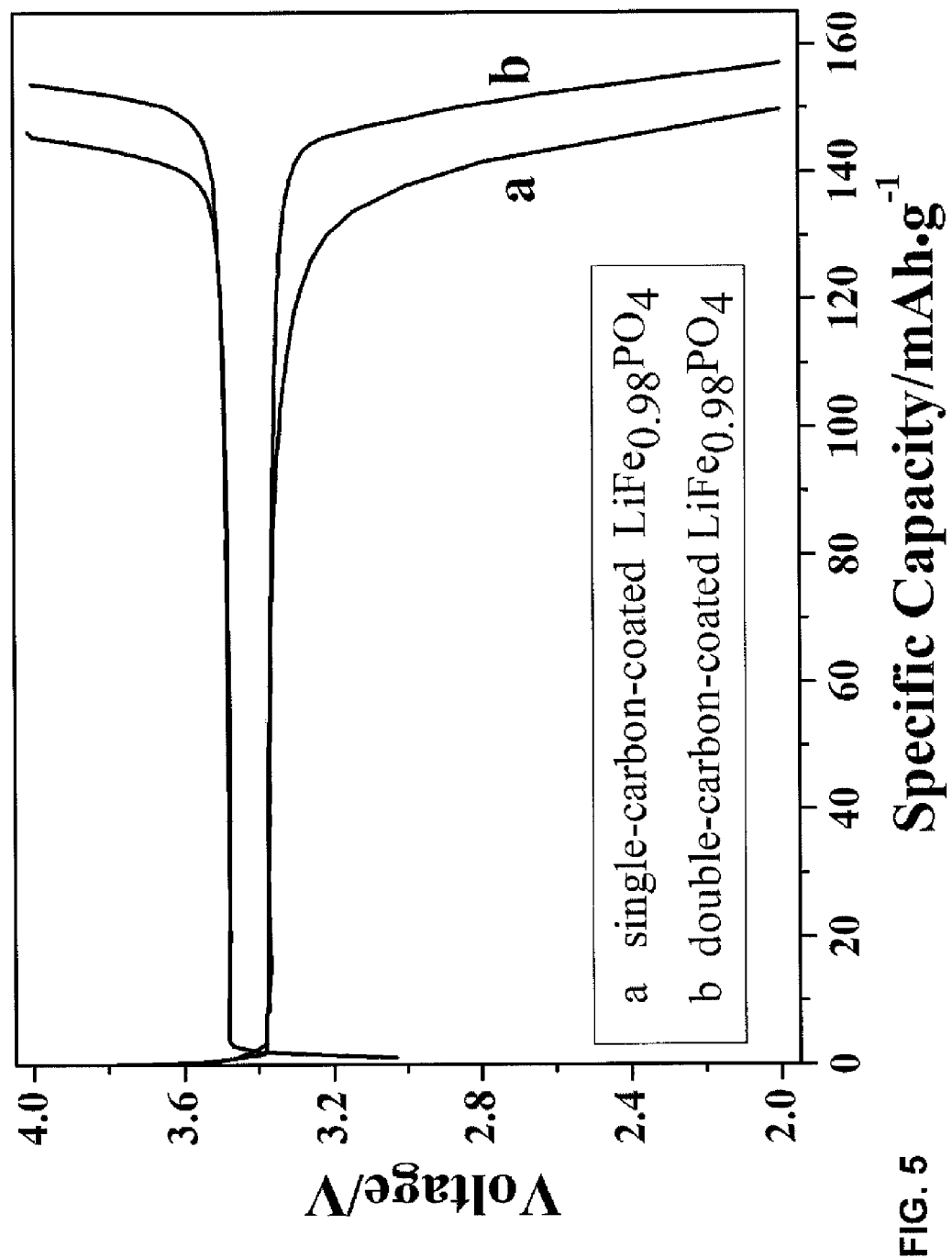
FIG. 5 illustrates charge/discharge profiles of (a) single-carbon-coated $LiFe_{0.98}PO_4$ and (b) double-carbon-coated $LiFe_{0.98}PO_4$.

The electrochemical properties of single-carbon-coated $LiFe_{0.98}PO_4$ and double-carbon-coated $LiFe_{0.98}PO_4$ are investigated and compared, and results are shown in FIG. 5. The charge and discharge capacities of the double-carbon-coated $LiFe_{0.98}PO_4$ are much higher than the single carbon-coated powders. This result is not surprising because the slow kinetics is enhanced by the excellent electronic conductivity brought about by the double carbon coatings.

Figure 6:
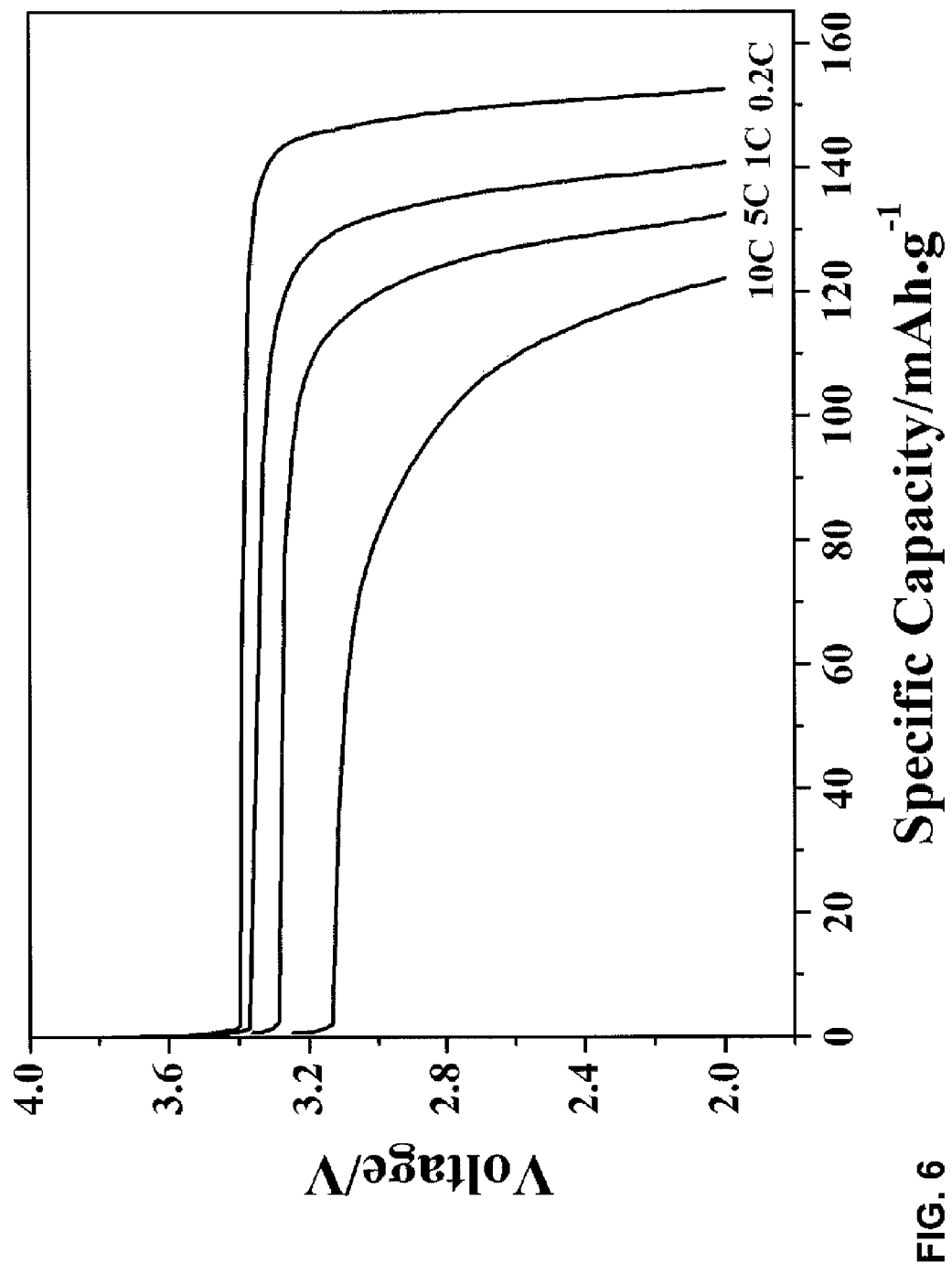
FIG. 6 illustrates discharge profiles of double-carbon-coated $LiFe_{0.98}PO_4$ at various C rates.

The rate capabilities of double-carbon-coated $LiFe_{0.98}PO_4$ are characterized by applying different current densities, and the results are shown in FIG. 6. In these tests, the cells were charged to 4.0 V at 0.2 C, and then discharged to 2.0 V at a rate of n C (wherein n=0.2, 1, 5, or 10). From FIG. 6, it can be seen that the $LiFe_{0.98}PO_4/C$ material has good rate capabilities. At a 0.2 C rate, the material discharges to its estimated theoretical capacity of 152.6 $mAh \cdot g^{-1}$. Even at the highest rate tested (10 C), the material achieves about 71% of its theoretical capacity.

Electrochemical properties of the double-carbon-coated $LiFe_{0.98}PO_4$ composites are characterized using a prismatic lithium ion cell-100 Ah. The cathode active material is prepared using certain proportions of $LiFe_{0.98}PO_4/C$ composite material (as-synthesized using a method of the present invention), polyvinylidene fluoride (PVDF), acetylene black, and graphite. These components are dispersed in N-methylpyrrolidone (NMP) and the resulting uniform slurry is applied to both faces of an aluminum foil, followed by a drying step. The anode is prepared by coating both faces of a copper foil with a slurried anode material, which is made by dispersing natural graphite, acetylene black, and carboxymethylcellulose (CMC) in water. Cells are constructed using the positive and negative electrodes with a polyethylene porous film as a separator. $LiPF_6$ (1 mol/L) is dissolved in a mixture of elthylene carbonate (EC) and methylethyl carbonate (MEC) (2:1 ratio by weight) to provide a non-aqueous electrolyte. The cells are tested at a rate of 0.5 C and cycled between 3.65 V and 2.0 V.

Figure 7:
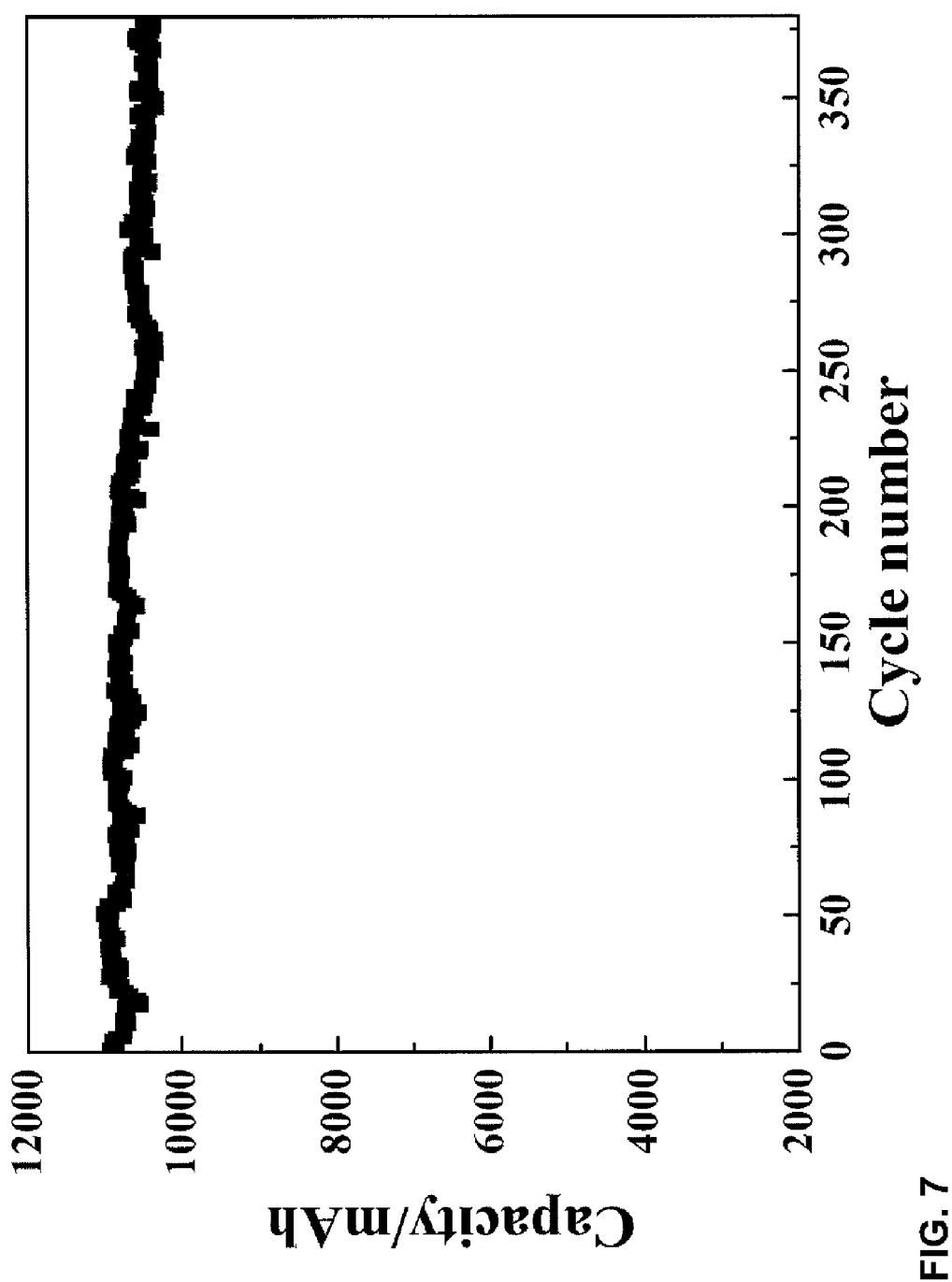
FIG. 7 illustrates cycling performance of a 10 Ah lithium ion battery made of double-carbon-coated $LiFe_{0.98}PO_4$.

FIG. 7 shows the corresponding plot of discharge capacity vs. cycle number of the Ah lithium ion battery having a cathode made of $LiFe_{0.98}PO_4/C$. As can be seen, there is no obvious capacity fading even after over 350 cycles. The results demonstrate the superior cycling stability of cells having cathodes made of a hierarchically structured $LiFe_{0.98}PO_4/C$, in accordance with embodiments of the invention.

EXAMPLES

Embodiments of the invention are further illustrated in the following examples. One skilled in the art would appreciate that these examples are for illustration only and are not intended to limit the scope of the invention.

Example 1

For the preparation of $Fe_{0.98}PO_4/C$ microspheres, a carbon precursor (e.g., sucrose) was dissolved in an aqueous solution of 1795.2 g $Fe_{0.98}PO_4 \cdot 2H_2O$ at 0.08 molar ratio of $Fe_{0.98}PO_4 \cdot 2H_2O$. The mixed solution was pumped into a continuously stirred mill (capacity of 10 L) and agitated for about 2 hours. The resulting average particles size (D50 value) of the slurry was controlled to be less than 2.0 μm. Spray-drying of water-based mixture to give spherical $Fe_{0.98}PO_4/C$ precursor; the solid volume density of the mixture was determined to be about 20-50%. The dried precursor was then sintered for 2 hours at a temperature of 600° C. under a nitrogen atmosphere to produce nanocrystalline $Fe_{0.98}PO_4/C$ microspheres with the D50 value of 20 μm and specific surface area of 10-15 $m^2/g$. The carbon content was measured to be about 1.0-2.0 wt %.

For the preparation of $LiFe_{0.98}PO_4/C$ microspheres, the as-obtained nanocrystalline $Fe_{0.98}PO_4/C$ microspheres were mixed with a stoichiometric amount of $Li_2CO_3$ and a carbon precursor (e.g., sucrose) to provide the lithium source and the second carbon-coating source, respectively. The molar ratio of Li and Fe may be maintained at a predetermined ratio (e.g., 1.02), while the amount of carbon precursor may be selected according to the carbon content of the $Fe_{0.98}PO_4/C$ materials to provide a desired final carbon content (for example, 2.0 wt %). After continuously stirring, adjusting solid volume density and the second spray drying process, the mixture was calcined at an appropriate temperature for a selected duration (for example, at 400° C. for 2 hours). Then, the products may be heated (e.g., at a rate of 10° C. per minute) to a higher temperature (e.g., 700° C.) and remained at the higher temperature (e.g., 700° C.) for a selected period of time (e.g., 12 hours) under an inert atmosphere (e.g., nitrogen atmosphere) to cure the products. The final product had the D50 value of 5-25 μm and a specific surface area of 20-30 $m^2 \cdot g$.

Example 2

In this example, $Fe_{0.96}PO_4 \cdot 2H_2O$ was selected as a ferric precursor. For the preparation of $Fe_{0.96}PO_4/C$ microspheres, a carbon precursor (e.g., sucrose) was dissolved in an aqueous solution of $Fe_{0.96}PO_4 \cdot 2H_2O$ at 0.095 molar ratio of $Fe_{0.96}PO_4 \cdot 2H_2O$. The mixed solution was pumped into a continuously stirred mill (capacity of 10 L) and agitated for about 2 hours. The resulting average particles size (D50 value) of the slurry was controlled to be less than 2.0 μm. The water-based mixture was spray dried to give a spherical $Fe_{0.96}PO_4/C$ precursor. The solid volume density of the mixture was determined to be about 20-50%. The precursor was then sintered for 4 hours at a temperature of 400° C. under a nitrogen atmosphere to produce nano-crystalline $Fe_{0.96}PO_4/C$ microspheres with a D50 value of 20 μm and a specific surface area of 10-15 $m^2/g$. The carbon content was measured to be about 1.0-2.0 wt %.

For the preparation of $LiFe_{0.96}PO_4/C$ microspheres, the as-obtained nano-crystalline $Fe_{0.96}PO_4/C$ microspheres were mixed with a stoichiometric amount of $Li_2CO_3$ and a carbon precursor (e.g., glucose) to provide the lithium source and the second carbon-coating source, respectively. The molar ratio of Li and Fe was maintained at about 1.00, while the amount of carbon precursor was determined according to the carbon content of $Fe_{0.96}PO_4/C$ materials to provide a final carbon content of 2.5 wt %. After continuously stirring, adjusting the solid volume density, and the second spray drying process, the mixture was calcined at a temperature of 400° C. for 2 hours, and then at a rate of 10° C. per minute to 700° C. and remained at 700° C. for another 12 hours under a nitrogen atmosphere. The final product had the D50 value of 5-25 μm and a specific surface area of 20-30 $m^2/g$.

Example 3

In this example, $Fe_{0.98}PO_4 \cdot 4H_2O$ was selected as a ferric precursor. For the preparation of $Fe_{0.98}PO_4/C$ microspheres, a carbon precursor (e.g., glucose) was dissolved in an aqueous solution of $Fe_{0.98}PO_4 \cdot 4H_2O$ at 0.15 molar ratio of $Fe_{0.98}PO_4 \cdot 4H_2O$. The mixed solution was pumped into a continuously stirred mill (capacity of 10 L) and agitated for about 2 hours. The resulting average particles size (D50 value) of the slurry was controlled to be less than 2.0 µm. The water-based mixture was spray dried to give a spherical $Fe_{0.98}PO_4/C$ precursor. The solid volume density of the mixture was determined to be about 20-50%. The precursor was then sintered for 3 hours at a temperature of 500° C. under a nitrogen atmosphere to produce nano-crystalline $Fe_{0.98}PO_4/C$ microspheres with a D50 value of 20 µm and a specific surface area of 10-15 m²/g. The carbon content was measured to be about 1.0-2.0 wt %.

For the preparation of $LiFe_{98}PO_4/C$ microspheres, the as-obtained nano-crystalline $Fe_{0.98}PO_4/C$ microspheres were mixed with a stoichiometric amount of LiOH and a carbon precursor (e.g., glucose) to provide the lithium source and the second carbon-coating source, respectively. The molar ratio of Li and Fe was maintained at 1.07, while the amount of carbon precursor was determined according to the carbon content of the $Fe_{0.98}PO_4/C$ materials to provide a final carbon content of 5.0 wt %. After continuously stirring, adjusting solid volume density, and the second spray drying process, the mixture was calcined at temperature of 400° C. for 2 hours, and then at a rate of 10° C. per minute to 700° C. and remained at 700° C. for another 12 hours under a nitrogen atmosphere. The final product had a D50 value of 5-25 µm and a specific surface area of 20-30 m²/g.

Example 4

In this example, $Fe_{0.98}PO_4 \cdot 2H_2O$ was selected as a ferric precursor. For the preparation of $Fe_{0.98}PO_4/C$ microspheres, a carbon precursor (e.g., sucrose) was dissolved in an aqueous solution of $Fe_{0.98}PO_4 \cdot 2H_2O$ at 0.125 molar ratio of $Fe_{0.98}PO_4 \cdot 2H_2O$. The mixed solution was pumped into a continuously stirred mill (capacity of 10 L) and agitated for about 2 hours. The resulting average particles size (D50 value) of the slurry was controlled to be less than 2.0 µm. The water-based mixture was spray dried to give a spherical $Fe_{0.98}PO_4/C$ precursor. The solid volume density of the mixture was determined to be about 20-50%. The precursor was then sintered for 4 hours at a temperature of 400° C. under a nitrogen atmosphere to produce nano-crystalline $Fe_{0.98}PO_4/C$ microspheres with a D50 value of 20 µm and specific surface area of 10-15 m²/g. The carbon content was measured to be about 1.0-2.0 wt %.

For the preparation of $LiFe_{0.98}PO_4/C$ microspheres, the as-obtained nano-crystalline $Fe_{0.98}PO_4/C$ microspheres were mixed with a stoichiometric amount of $LiNO_3$ and a carbon precursor (e.g., citric acid) to provide the lithium source and the second carbon-coating source, respectively. The molar ratio of Li and Fe was maintained at 1.05, while the amount of carbon precursor was determined according to the carbon content of $Fe_{0.98}PO_4/C$ materials to provide a final carbon content of 3.0 wt %. After continuously stirring, adjusting the solid volume density, and the second spray drying process, the mixture was calcined at temperature of 600° C. for 2 hours, and then at a rate of 2° C. per minute to 750° C. and remained at 750° C. for another 10 hours under a nitrogen atmosphere. The final product had a D50 value of 5-25 µm and a specific surface area of 20-30 m²/g.

Example 5

In this example, $Fe_{0.96}PO_4 * 2H_2O$ was selected as a ferric precursor. For the preparation of $Fe_{0.96}PO_4/C$ microspheres, a carbon precursor (e.g., glucose) was dissolved in an aqueous solution of $Fe_{0.96}PO_4 \cdot 2H_2O$ at 0.11 molar ratio of $Fe_{0.96}PO_4 \cdot 2H_2O$. The mixed solution was pumped into a continuously stirred mill (capacity of 10 L) and agitated for about 2 hours. The resulting average particles size (D50 value) of the slurry was controlled to be less than 2.0 µm. The water-based mixture was spray dried to give a spherical $Fe_{0.96}PO_4/C$ precursor. The solid volume density of the mixture was determined to be about 20-50%. The precursor was then sintered for 2 hours at a temperature of 600° C. under a nitrogen atmosphere to produce nano-crystalline $Fe_{0.96}PO_4/C$ microspheres with a D50 value of 20 µm and a specific surface area of 10-15 m²/g. The carbon content was measured to be about 1.0-2.0 wt %.

For the preparation of $LiFe_{0.96}PO_4/C$ microspheres, the as-obtained nanocrystalline $Fe_{0.96}PO_4/C$ microspheres were mixed with a stoichiometric amount of $Li_2CO_3$ and a carbon precursor (e.g., citric acid) to provide the lithium source and the second carbon-coating source, respectively. The molar ratio of Li and Fe was maintained at 1.1, while the amount of carbon precursor was determined according to the carbon content of $Fe_{0.96}PO_4/C$ materials to provide a final carbon content of 4.0 wt %. After continuously stirring, adjusting the solid volume density, and the second spray drying process, the mixture was calcined at a temperature of 500° C. for 2 hours, and then at a rate of 6° C. per minute to 650° C. and remained at 650° C. for another 15 hours under a nitrogen atmosphere. The final product had a D50 value of 5-25 µm and a specific surface area of 20-30 m²/g.

Embodiments of the present may have one or more of the following advantages. First, because spherical particles may have higher tapped densities than those with irregular shapes, which generally result in a lot of vacant space between the particles and bad fluidity (flowability) of the powders, the spray-drying approach is employed to form microspherical particles with highly homogeneous morphology. Secondly, dual carbon coating processes are utilized to produce high porosity and to assure the uniformity of the carbon layers on both the primary and secondary $LiFe_xPO_4$ particles. The carbon coating layers play a role in improving the conductivity of $LiFe_xPO_4$, as well as acting as a nucleating agent to decrease the particle sizes of the final products and a reductant to avoid formation of undesirable ferric impurities. A complete, homogeneous, thin coating of carbon ensures that the $LiFe_xPO_4$ particles can receive electrons from all directions and that the $Li^+$ ions can penetrate through the carbon layer without appreciable polarization. In addition, the more the carbon content, the lower the tapped density. Accordingly, the carbon precursor concentrations are importance and preferably are precisely controlled. Other advantages of embodiments of the invention include: suitable for kilogram-scale industrialized production, and using water-based synthetic systems, which avoid the safety problems and reduce the production and organic solvent recycling costs.

While this invention has been described in terms of certain embodiments thereof, it is not intended that it be limited to the above description, but rather only to the extent set forth in the following claims. The embodiments of the invention in which an exclusive property or privilege is claimed are defined in the following claims.

What is claimed is:
1. A method for preparing the cathode active material, comprising:
  drying an aqueous mixture containing $Fe_xPO_4$ and a carbon precursor to obtain a dried mixture, wherein $0.9 \le x < 1$;
  sintering the dried mixture to obtain $Fe_xPO_4/C$ microspheres;

mixing the $Fe_xPO_4$/C microspheres with a lithium salt and a second carbon precursor in distilled water to form a second mixture;

drying the second mixture to obtain a dried second mixture; and calcining the dried second mixture to obtain the cathode active material, wherein an amount of the second carbon precursor is determined, according to a carbon content of the $Fe_xPO_4$/C microspheres, to provide a final carbon content of 2.0-5.0 wt %.

2. The method according to claim 1, wherein a molar ratio of the carbon precursor and the $Fe_xPO_4$ is 0.08-0.15.

3. The method according to claim 1, wherein the drying comprises spray-drying.

4. The method according to claim 1, wherein a molar ratio of lithium and phosphorus in the second mixture is 1.0-1.1.

5. The method according to claim 1, wherein the sintering comprises annealing at a temperature of about 400-600° C. for a duration in a range from 2 to 4 hours.

6. The method according to claim 1, wherein the calcining comprises annealing at a temperature of about 400-600° C. for 2 hours, and then at a rate of 2-10° C. per minute to 650-750° C. and remained at 650-750° C. for another 10-15 hours.

7. The method according to claim 1, wherein the calcining is carried out under a non-oxidizing atmosphere.

* * * * *